(12) United States Patent
Malpass et al.

(10) Patent No.: US 10,391,720 B2
(45) Date of Patent: Aug. 27, 2019

(54) METHOD FOR MAKING A SLIP RESISTANT MAT (71) Applicant: Cintas Corporation, Cincinnati, OH (US)

(72) Inventors: Ian S. Malpass, Palm Beach Gardens, FL (US); Jeffery L. Cofer, Conyers, GA (US); Edin Kurtovic, Lawrenceville, GA (US)

(73) Assignee: Cintas Corporate Services, Inc., Cincinnati, OH (US)

( * ) Notice: Subject to any disclaimer, the term of this patent is extended or adjusted under 35 U.S.C. 154(b) by 297 days.

(21) Appl. No.: 15/411,472

(22) Filed: Jan. 20, 2017

(65) Prior Publication Data
US 2017/0129189 A1    May 11, 2017

Related U.S. Application Data (60) Division of application No. 14/157,841, filed on Jan. 17, 2014, now abandoned, which is a continuation of
(Continued)

(51) Int. Cl.
*B29C 67/08* (2006.01)
*B29C 39/14* (2006.01)
(Continued)

(52) U.S. Cl.
CPC .......... *B29C 67/08* (2013.01); *A47G 27/0231* (2013.01); *A47G 27/0281* (2013.01);
(Continued)

(58) Field of Classification Search
CPC ..... B29C 67/08; B29C 33/3857; B29C 33/40; B29C 35/02; B29C 39/148; B29C 41/12
(Continued)

(56) References Cited

U.S. PATENT DOCUMENTS

| 4,653,366 A | 3/1987 | Nichols et al. |
| 5,305,565 A | 4/1994 | Nagahama et al. |

(Continued)

FOREIGN PATENT DOCUMENTS

| EP | 1075937 A2 | 2/2001 |
| EP | 1384520 A2 | 1/2004 |

(Continued)

OTHER PUBLICATIONS

Merriam-Webster Dictionary, definition of "bridge" copyright 2015.
(Continued)

*Primary Examiner* — Christina A Johnson
*Assistant Examiner* — Xue H Liu
(74) *Attorney, Agent, or Firm* — Wood Herron & Evans LLP (57) ABSTRACT

A method for making a slip resistant mat can include assembling parts with predetermined geometries to form a mold that can be used for making slip resistant mats that have channels to account for moisture between the mat and the floor. The unique geometries of the parts which form the mold can be manufactured efficiently and with reduced costs. The mold of this invention can be used to make slip resistant mats with channels that can both dissipate water and offer a high degree of mat to floor surface contact.

20 Claims, 6 Drawing Sheets

Related U.S. Application Data application No. PCT/US2013/054488, filed on Aug. 12, 2013.

(60) Provisional application No. 61/781,148, filed on Mar. 14, 2013.

(51) Int. Cl.
| | |
|---|---|
| *A47G 27/02* | (2006.01) |
| *B29C 33/38* | (2006.01) |
| *B29C 33/40* | (2006.01) |
| *B29C 35/02* | (2006.01) |
| *B29C 41/12* | (2006.01) |
| *B29D 7/00* | (2006.01) |
| B29K 83/00 | (2006.01) |
| B29K 21/00 | (2006.01) |
| B29L 7/00 | (2006.01) |
| B29L 31/00 | (2006.01) |

(52) U.S. Cl.
CPC .......... *B29C 33/3857* (2013.01); *B29C 33/40* (2013.01); *B29C 35/02* (2013.01); *B29C 39/148* (2013.01); *B29C 41/12* (2013.01); *B29D 7/00* (2013.01); *B29K 2021/00* (2013.01); *B29K 2083/00* (2013.01); *B29K 2845/00* (2013.01); *B29K 2883/00* (2013.01); *B29K 2905/00* (2013.01); *B29L 2007/001* (2013.01); *B29L 2031/7324* (2013.01); *B29L 2031/757* (2013.01); *Y10T 428/24165* (2015.01); *Y10T 428/24612* (2015.01)

(58) Field of Classification Search
USPC ....................................................... 264/225
See application file for complete search history.

(56) References Cited

U.S. PATENT DOCUMENTS

| | | | |
|---|---|---|---|
| 5,456,966 A | 10/1995 | Austin | |
| 5,613,332 A | 3/1997 | Saylor, Jr. | |
| 5,968,631 A | 10/1999 | Kerr | |
| 6,093,469 A | 7/2000 | Callas | |
| 6,258,202 B1 | 7/2001 | Callas | |
| 6,277,233 B1 | 8/2001 | Daley | |
| 6,303,068 B1 | 10/2001 | Kerr et al. | |
| 6,428,873 B1 | 8/2002 | Kerr | |
| 6,589,631 B1 | 7/2003 | Suzuki et al. | |
| 6,656,562 B2 | 12/2003 | Malpass et al. | |
| RE38,422 E | 2/2004 | Rockwell, Jr. et al. | |
| 6,726,190 B2 | 4/2004 | Malpass et al. | |
| 6,800,234 B2 | 10/2004 | Ferguson et al. | |
| 6,808,588 B1 | 10/2004 | Streeton et al. | |
| 6,866,916 B1 | 3/2005 | Malpass et al. | |
| 6,946,183 B2 | 9/2005 | Malpass et al. | |
| 8,236,392 B2 | 8/2012 | Sawyer et al. | |
| 2002/0114926 A1 | 8/2002 | Malpass et al. | |
| 2004/0007802 A1 | 1/2004 | Malpass et al. | |
| 2004/0256765 A1 | 12/2004 | Malpass et al. | |
| 2005/0100711 A1 | 5/2005 | Malpass et al. | |
| 2006/0083888 A1 | 4/2006 | Downes et al. | |
| 2011/0014431 A1 | 1/2011 | Fowler | |
| 2012/0117909 A1 | 5/2012 | Reichwein et al. | |
| 2012/0324805 A1 | 12/2012 | Reichwein et al. | |
| 2013/0247490 A1 | 9/2013 | Strait | |

FOREIGN PATENT DOCUMENTS

| | | |
|---|---|---|
| GB | 520231 A | 4/1940 |
| JP | S5865990 A | 4/1983 |
| WO | 0217759 A2 | 3/2002 |

OTHER PUBLICATIONS

*Fiber Optic Designs, Inc.* v. *New England Potter, LCC,*(D. Colorado, May 14, 2008).

International Searching Authority, International Search Report and Written Opinion of the International Searching Authority; PCT/US13/54488, dated Jan. 16, 2014, 9 pgs.

European Patent Office, Official Letter, European Patent Application No. EP 13877646.3, dated Feb. 22, 2016, 7 pgs.

METHOD FOR MAKING A SLIP RESISTANT MAT

This application claims priority to U.S. Non-provisional patent application Ser. No. 14/157,841, filed Jan. 17, 2014, which is a continuation of PCT Application Serial No. PCT/US13/54488, filed Aug. 12, 2013 and also claims the filing benefit of U.S. Provisional Patent Application Ser. No. 61/781,148, filed Mar. 14, 2013, each of which is hereby incorporated by reference in its entirety.

BACKGROUND OF THE INVENTION

This invention relates generally to slip resistant, anti-skid or anti-creep mats. Specifically, this invention relates to such mats and a method and system for making slip resistant mats.

In the past, floor mats, consisting of rubber backed carpet tuft, were made with either a smooth back, primarily for solid or non carpeted floors, or with a variety of "grippers" or "cleats" arranged to reduce the movement of the mat on carpeted floors. However, both of these approaches resulted in floor mats that were not skid resistant on smooth floors, especially those floors with residual moisture under the mat, perhaps from the moping of the floor and then the mat being replaced, or the mat being slightly damp when delivered and rolled out. In such cases, the water on the back of the mat becomes a slip hazard. The movement of the mat in the gripper/cleat mat design results from the force of foot and vehicle traffic on the mat which causes a deformation around the compressed area and then upon removal of such force the mat returns to a different position. For the smooth back mats, movement of the mat results from similar forces and the lack of any device or feature intended to secure the mat in place.

A number of approaches have been taken to attempt to reduce the movement of mats. One known approach to the problem is to fasten the mat to the intended surface by various devices, such as that suggested by Kessler in U.S. Pat. No. 6,068,908 which utilizes a system by which a mat is fastened to the surface using a clip system. While this approach is well-developed, it results in floor mats that are difficult or impossible to move from place to place and the structures required to attach the mat add cost to the mat and difficulty to the installation. Also, attached mats are more rigid.

Another approach involves the use of a frame into which the mat is placed, such as the frames used by Moffitt, Jr. in U.S. Pat. No. 4,361,614 and Kessler in U.S. Pat. No. 6,042,915. The frame can be located upon the flooring surface or inlaid to be flush with the flooring surface. In either circumstance, unless the frame is fastened as mentioned above or embedded in the surface, the frame still has a tendency to shift on the surface. If the frame is fastened or embedded, the other problems mentioned above still remain.

Another approach involves the use of suction cups, such as those commonly found on shower and bath mats, examples of which can be found by Lindholm in U.S. Pat. No. 6,014,779 in which the corners of a rectangular mat are held by four suction cups and by Gavlak in U.S. Pat. No. 2,081,992 in which a plurality of suctions cups holds the bathtub mat to the surface. While this approach provides acceptable slip-resistance for light shower and bath mat applications, traditional suctions cups are not sufficient to provide sufficient anti-skidding forces to prevent slipping and movement in high traffic and high load areas. Traditional suction cups also result in a wavy mat surface which is more difficult for individuals and loads to traverse.

As mentioned, existing approaches to reducing movement of mats include significant limitations. Further, the known approaches require additional space, components, installation effort and expense. As a result, significant improvement can still be made relative to reducing the movement of mats especially in the presence of water or moisture trapped between the mat and the floor.

In addition to the problem of slip resistant mats moving when traversed by heavy loads or wheeled carts, another drawback of known slip resistant mats relates to the manufacturing process of these mats. The grippers projecting from the mat backing reduce the surface area of the mat in contact with the floor. When the grippers are wet, the potential for mat slippage and possible resulting injuries increase. Many known mat manufacturers attempt to solve such problems by increasing the number of grippers on the mat backing.

To manufacture one type of slip resistant mat, a metal screen, punched with a plurality of small holes is used. The equipment used to manufacture the gripper mats allows the rubber to flow there through during the curing process, and form the little grippers. The gripper pattern often has a number of small rubber protrusions perhaps, usually round, that are created by perforating a metal screen, or Teflon® coated belt used to form the mat backing. These grippers were introduced to reduce the movement on carpet in the 1970's, and most manufacturers of mats use some form of this design for the current standard mat. The more metal that is removed with punching, the less resilient it is to being deformed and once bent, it is of no use in the manufacturing process. This has limited the open area of the screens and meant that there is a physical limit on the pattern on the back of the mat.

Conventional manufacturing techniques have not addressed these problems often associated with conventional slip resistant mats and the associated systems and methods for mat production.

Accordingly, there is a need in the art for a method and system for making slip resistant mats positioned over residual moisture on floors. Another need exists for such mats that can withstand heavy mechanical loads and do not move when traversed by such loads. Another need exists in the art for a system and method for making a slip resistant mat in an efficient manner. Another need exists in the art for making slip resistant mats with robust, re-usable and reliable molds, screen belts and the like.

SUMMARY OF THE INVENTION

The object of this invention is to provide a slip resistant mat and associated manufacturing techniques that overcome these and other problems in the prior art. In one aspect, this is achieved by maximizing the surface area of the mat in contact with the floor such that instead of less than 15% of mat to floor surface area contact with known gripper-style mats, it is over 90% with various embodiments of this invention. But, unlike a smooth-backed mat, embodiments of this invention have a pattern of small channels on the mat backing that allow moisture to be displaced and excellent mat contact with the floor, thereby increasing the coefficient of friction to be well in excess of known mats. This invention utilizes the channels to reduce the movement of the mat especially in the presence of moisture between the mat backing and the floor. The channels provide an area for any trapped moisture to escape from between a lower surface of the mat and the floor to allow the mat to adhere to the floor surface and assist in retaining the mat in its original position.

The size, pattern and shape specifications of the channels can be varied and they can be positioned in a variety of arrangements. The channels can be any shape that is formed on the underside of the mat. Also, in one embodiment, the channels are positioned in regularly spaced rows resulting in an evenly spaced arrangement, although they can be spaced in an infinite number of combinations. In one embodiment, the pattern extends to the edge of the mat in order to assist in gripping the floor, particularly where the mat is exposed to cart traffic.

In another embodiment, the channels may be different sizes and shapes. The existence of multiple sizes and shapes of channels permits improved performance on a variety of floor surfaces since larger channels perform better on some surfaces and smaller channels perform better on others.

One advantage of this invention is that the mat resists slipping to a much greater extent than existing mat designs even in the presence of moisture between the mat and the floor. Another advantage is that it provides the enhanced slip-resistance without adding any weight or installation complexity to existing mat designs. Another advantage is that the invention does not require any permanent fastening means and is therefore easy to move to different locations. Another advantage is that the channels provide additional cushioning for pedestrian and vehicular traffic. Another advantage is that the cushioning of the channels yields an anti-fatigue effect, thereby resulting in reduced wear and tear and routine maintenance and increased user comfort, especially for locally stationed employees spending long period of time on the mat. Another advantage of the invention is that the slip-resistance is effective on a wide variety of surfaces.

In other embodiments, this invention is generally drawn to a system and method for making a slip resistant mat. More particularly, the system and method can include assembling parts with predetermined geometries to form a mold screen that can be used for making slip resistant mats that have channels or other features. Each part of the mold screen can have predetermined geometrical shapes that can be manufactured efficiently and with reduced cost.

The raw material used to form the slip resistant mat may comprise rubber as is well known in the art. According to one exemplary embodiment, the mold system of this invention allows for the rubber to have a predefined geometry which includes the channels or other features. This predefined geometry includes regions of rubber that are positioned to correspond with the channels in the platen.

One part of the system to make the mat can include a model platen. The model platen may comprise a metal sheet that has a replica of the plurality of channels that form a surface of the metal sheet. The replica channels can be shaped to replicate the basic structure of the slip resistant pattern on the mat backing. The channels can be formed by a process that employs a computer numerical controlled (CNC) machine. By using a CNC machine for forming the model platen, the model platen can be made very efficiently, precisely and with reduced cost compared to conventional machining methods.

According to one aspect of this invention, a casting system is used in which the aluminum plate or model platen is machined with CNC routers. The machined model platen is used to create a mold screen which has a negative of the slip resistant pattern on the mat backing. Using a negative means that the CNC machine formed replica channels are very thin and do not affect the integrity of the model platen or mold screen. A blend of silicone, with a reinforcing backing of Nomex® or Kevlar®, may be used to create the mold screen.

The replica pattern created in the model platen may be only 0.25 inches deep and 0.045 inches wide. The replica channel pattern is a continuous series of lines which would not have been possible to create with known manufacturing techniques. The negative of the channel pattern is created in the mold screen. Using continuous channel lines and silicone, the issue of air entrapment can be avoided which to date has been an issue with patterns that have small objects and tolerances. The mold screen with a negative pattern of the channels is then used to manufacture the mat backing with the slip resistant channel pattern, similar to that machined into the model platen.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

A slip resistant mat, system and method for making such a mat can include assembling parts with predetermined geometries to form a mold system that can be used for making slip resistant mats. The unique geometries of the parts which form the mold system can be manufactured efficiently, robustly and with reduced cost. The mold system of this invention can be used to make slip resistant mats with increased surface area contact between a backing of the mat and the floor. This can be a particularly advantageous feature to overcome residual moisture trapped between the mat backing and the floor to provide resistance to the mat from slipping.

Figures 6, 6A:
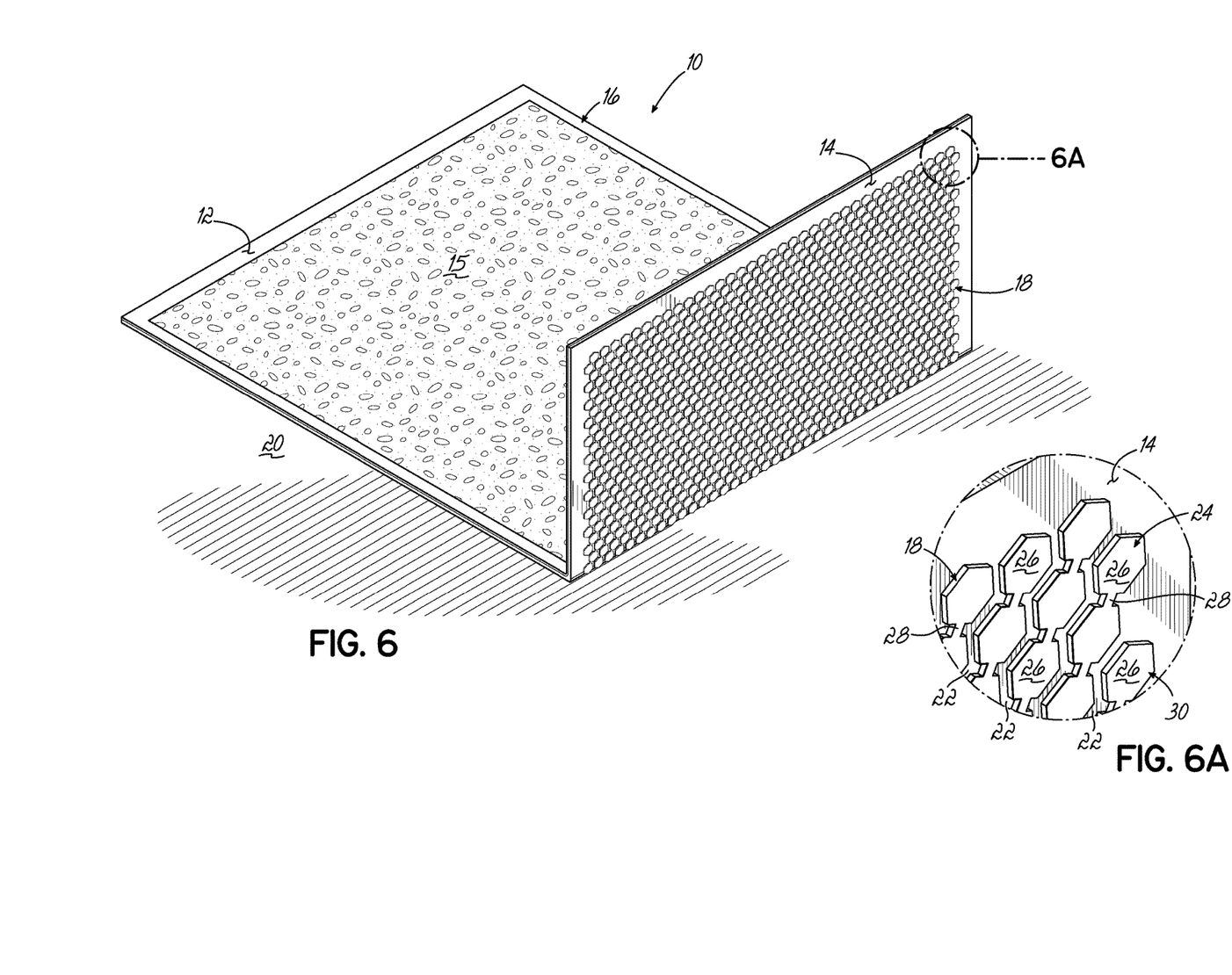
FIG. 6 is a perspective view of a mat showing the backing formed according to one embodiment of this invention.
FIG. 6A is an enlarged view of the encircled region 6A of FIG. 6 showing a pattern of channels on the mat backing of the mat of FIG. 6.

Exemplary embodiments of this invention will be described with reference to the drawings and figures in which like numerals represent like elements throughout the several figures. Referring now to FIG. 6 which illustrates a perspective view of an exemplary slip resistant mat 10 according to one embodiment of this invention. The exemplary slip resistant mat 10 includes an upper surface 12 and a lower or backing surface 14 for the mat 10. The upper surface 12 may have a yarn, carpet or other fabric layer 15 laminated or otherwise bonded to a support layer 16. The mat backing 14 of the support layer 16 includes the slip resistant pattern 18 to inhibit slipping of the mat 10 relative to a floor 20 on which it is supported. While this is one exemplary embodiment of a slip resistant mat according to this invention, those of ordinary skill in the art will appreciate that a large variety of other mat designs, styles, constructions and configurations according to various aspects of this invention are within the scope of this invention.

The slip resistant mat 10 according to various embodiments of this invention includes the mat backing 14, one embodiment of which is shown in FIGS. 6-6A. The mat backing 14 includes the pattern 18 in the form of a series of recessed channels 22 which, in the embodiment shown in FIG. 6A, each channel 22 is generally parallel to an adjacent channel in a zig-zag arrangement. The channels 22 are formed around rows of projections 24 and each row of projections is a series of hexagonal-shaped protuberances 26 joined to an adjacent hexagonal-shaped protuberance 26 by a bridge 28. The protuberances 26 and bridges 28 combine to form a lower surface 29 of the mat 10 which contacts the floor surface 20. One advantageous aspect of the mat backing 14 according to various embodiments of this invention is that the combination of hexagonal-shaped protuberances 26 and bridges 28 which project from the bottom surface of the mat 10 offers increased surface area contact between the mat backing 14 and the floor 20. As previously noted, the surface area contact provided by the lower surface 29 according to various embodiments of this invention for the mat backing 14 may be as high as 90% or greater. However, channels 22 formed in the mat backing 14 provide for the dissipation and channeling of any moisture or water trapped between the lower surface 29 and the floor 20 thereby allowing for the projections 24 on the mat backing 14 to provide increased resistance to slippage of the mat 10 relative to the floor 20 when the moisture is trapped within the channels 22. Those of ordinary skill in the art will readily appreciate that the particular geometries, shapes, dimensions and specifications of the mat backing may be varied from those shown and described herein while still being within the scope of this invention.

Figure 3:
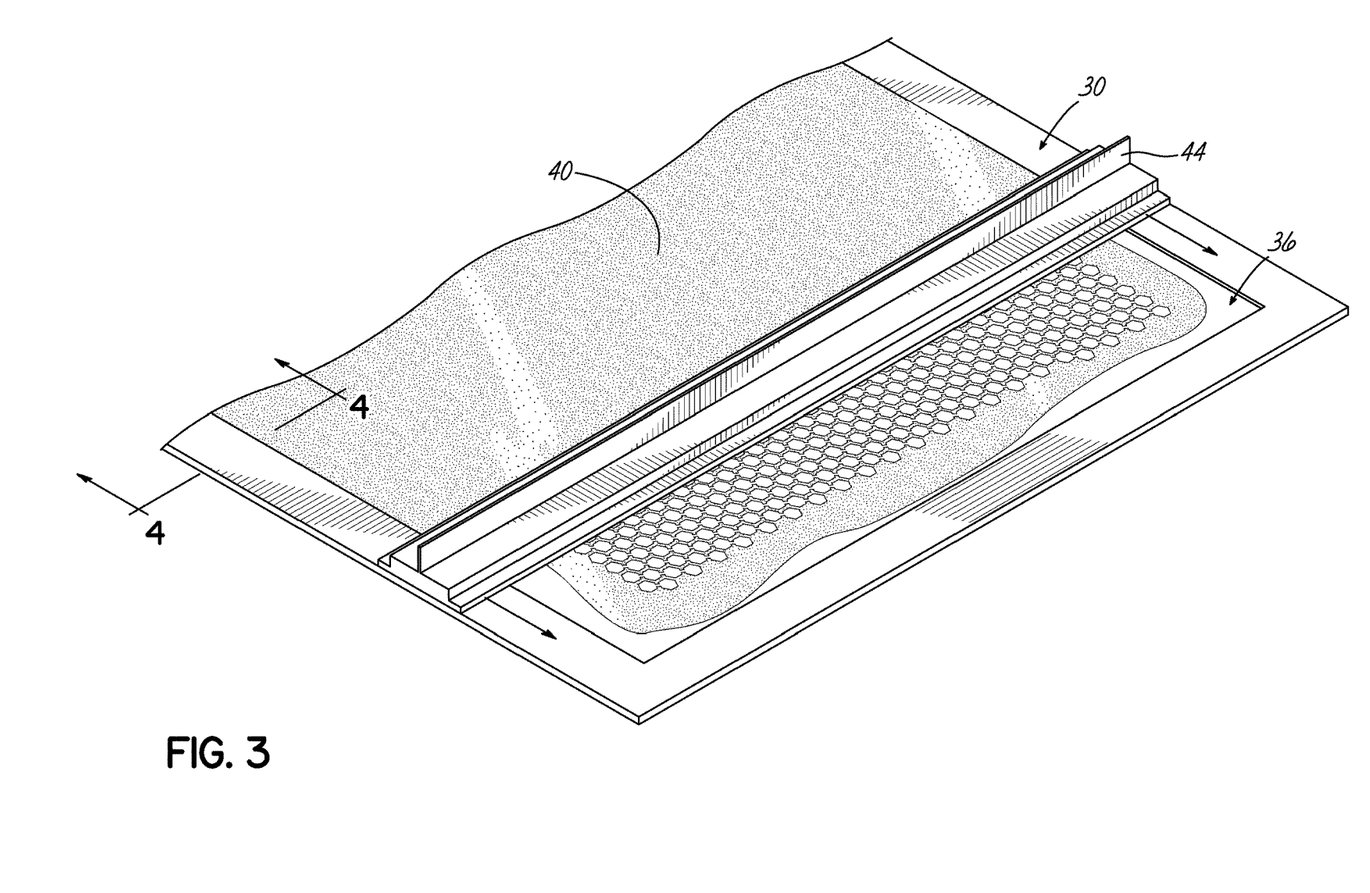
FIG. 3 is a view similar to FIG. 2 showing the mold material being spread over the platen according to one embodiment of this invention.
Figure 4:
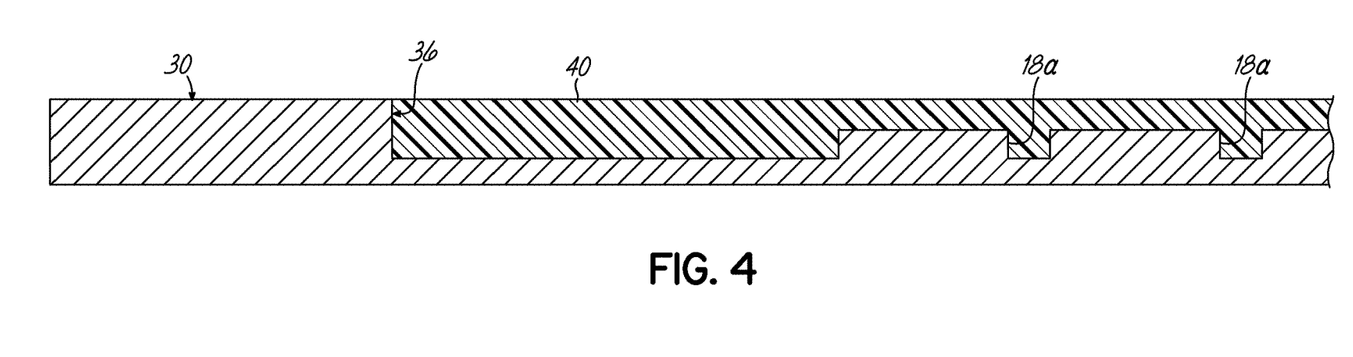
FIG. 4 is a cross-sectional view taken along line 4-4 of FIG. 3.
Figures 5, 5A:
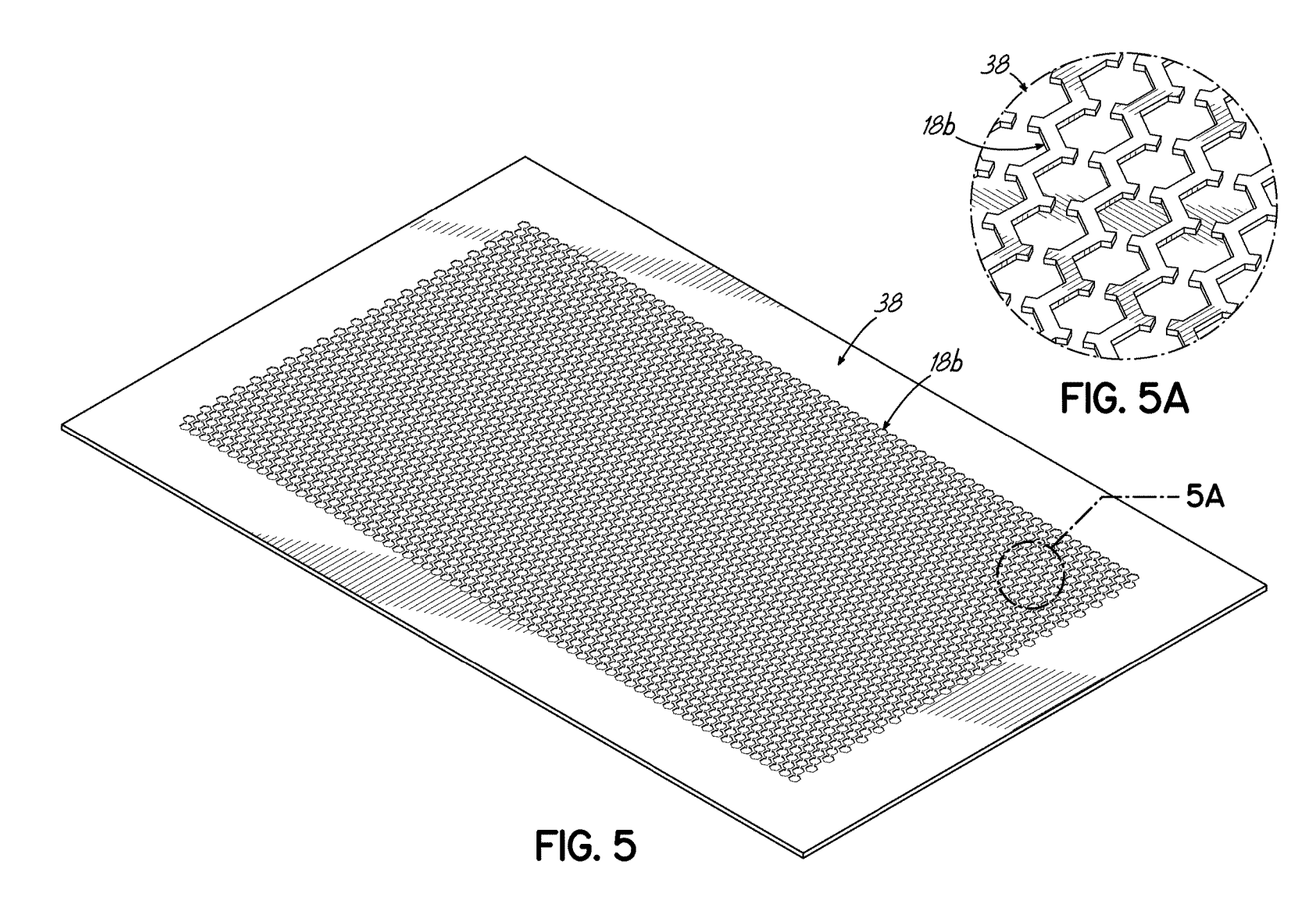
FIG. 5 is a perspective view of a mold utilized to form a slip resistant mat according to one embodiment of this invention.
FIG. 5A is an enlarged view of the encircled portion 5A of FIG. 5 showing a negative pattern in the mold of FIG. 5.

Referring to FIGS. 1-5A, a method and system according to various embodiments of this invention for manufacturing the slip resistant mat 10 with a mat backing 14 of the type previously described begins with the production of a model platen 30. In one embodiment, the model platen 30 is fabricated from a metal plate 32, such as a ¼ inch thick 5052 aluminum plate which is machined with a CNC router 34 to have a configuration to replicate to the mat backing 14 as previously described. The CNC router 34 machines the plate 32 into the model platen 30 which, according to one embodiment, involves utilizing a 1/16 inch bit on the router 34 to form a replica 18a of the slip resistant pattern 18 corresponding to the mat backing 14 to a depth of approximately 0.025 inches on the model platen 30. A pocket 36, about 0.070 inches deep, is machined on the model platen 30 to the desired length and width of the mat 10. The model platen 30 is utilized to produce a screen mold 38 (FIGS. 5-5A). The screen mold 38 includes a negative 18b of the shape, design and configuration of the slip resistant pattern 18 on the mat backing 14.

Figure 1:
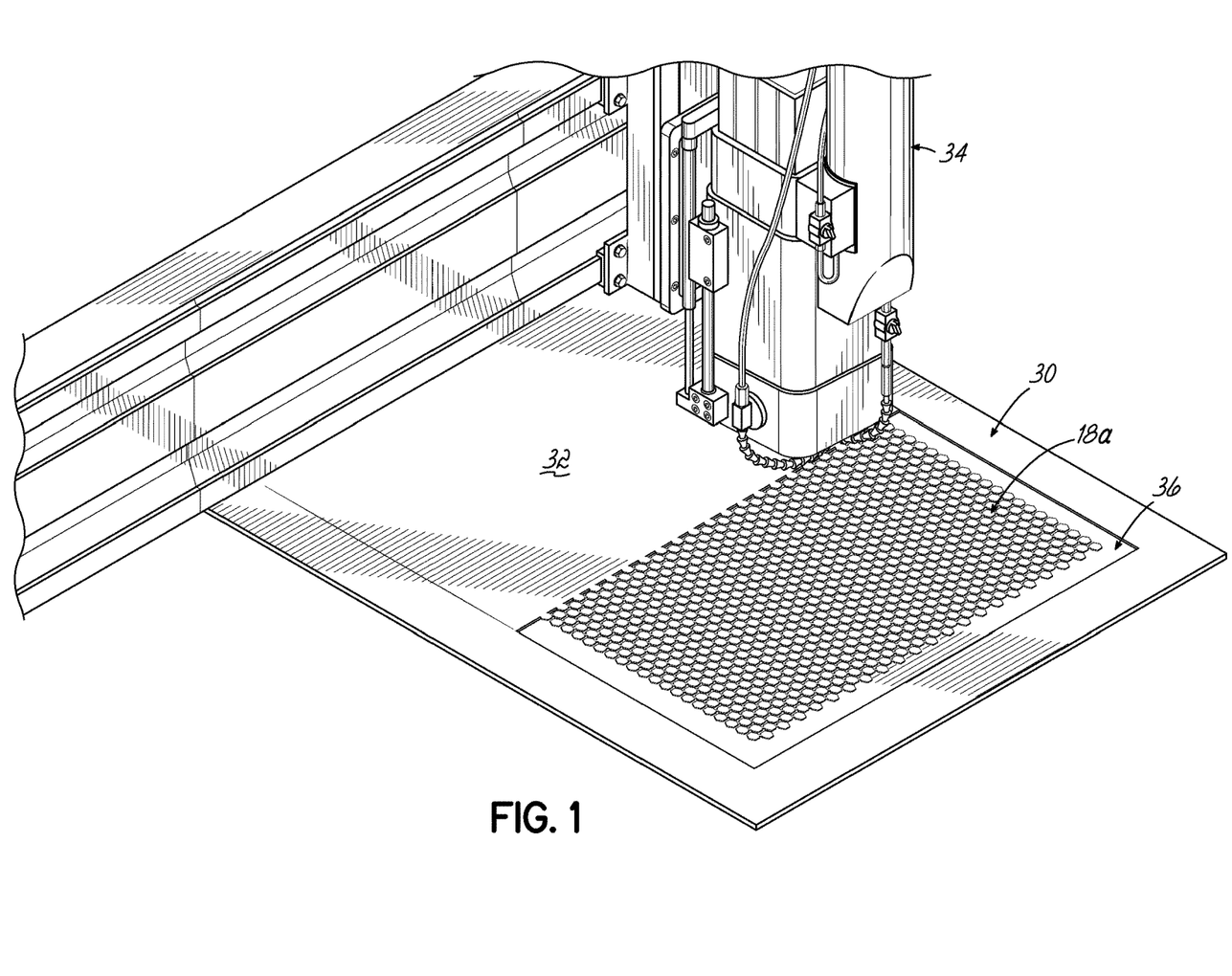
FIG. 1 is a perspective view showing a CNC router utilized according to one embodiment of this invention to form a platen utilized in the manufacture of a slip resistant mat according to this invention.
Figure 2:
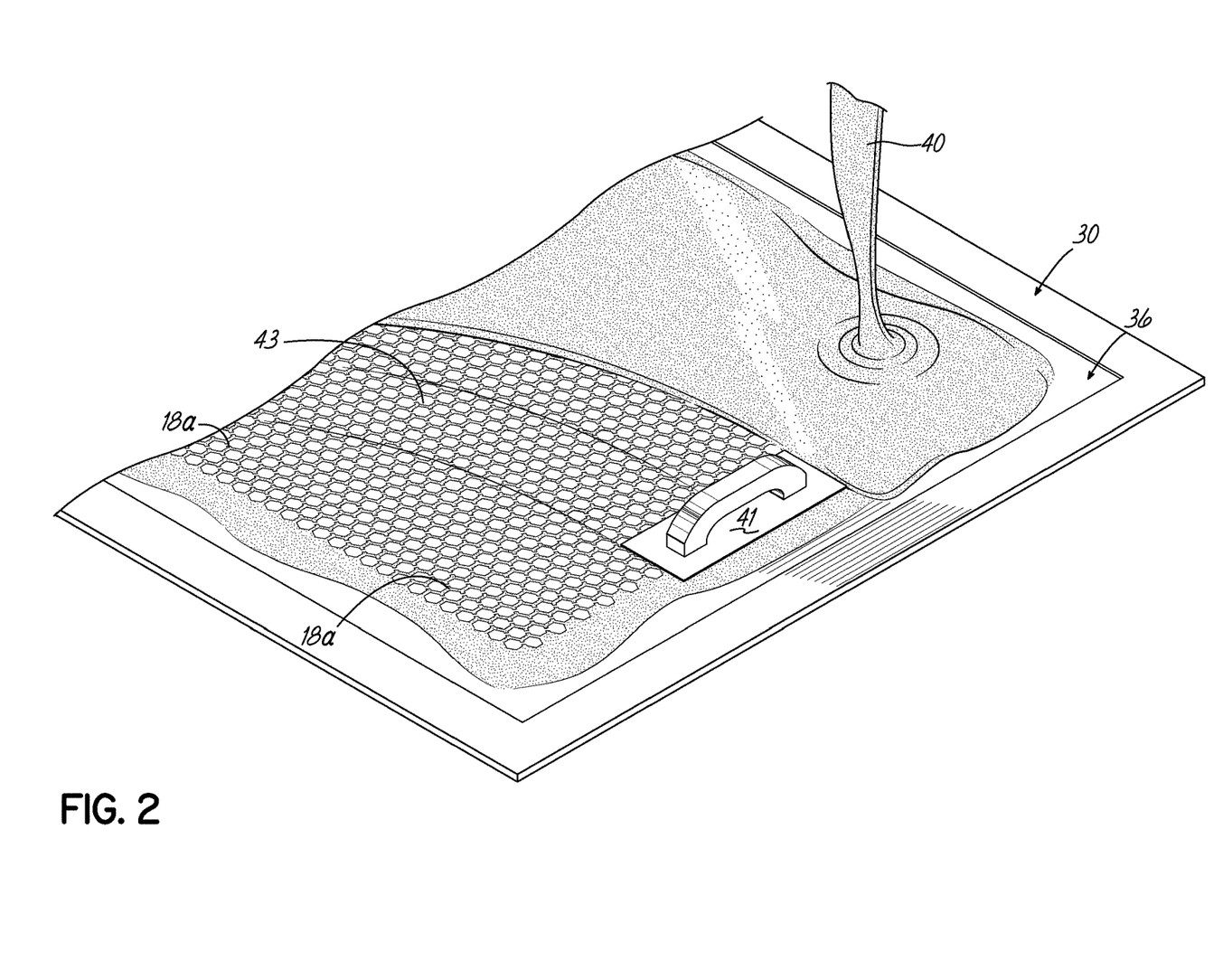
FIG. 2 is a perspective view showing one step in the process of utilizing the platen according to one embodiment of this invention to generate a mold to form a slip resistant mat according to various embodiments of this invention.

As shown in FIG. 2, once the model platen 30 is completed, it has the pocket 36 the size of the desired screen mold 38 with the replica 18a of the mat backing 14 configuration machined on the model platen 30. The replica pattern 18a on the model platen 30 is the pattern 18 to be produced on the mat backing 14 to advantageously displace moisture and hold the mat 10 to the underlying floor 20. The depth of the pocket 36 machined into the model platen 30 provides adequate screen mold 38 strength for durable screen mold 38 production; however, the depth of the pocket 36 is thin enough to minimize any negative influences of excessive insulation in the press process during the production of the anti-slip mat 10.

Referring to FIGS. 2-5A, the machined model platen 30 is utilized to form and produce the screen mold 38 which has the negative 18b of the slip resistant pattern 18 on the mat backing 14. The model platen 30 is initially filled with mold material 40 to be cast into the model platen 30. In one embodiment, the mold material 40 utilized in the production of slip resistant mats 10 according to this invention is a two-part curable silicone. After the two parts of the silicone are mixed, the mixture is spread into the model platen 30 before it begins to set. Specifically, as shown in FIGS. 2 and 3, the silicone mold material 40 is pre-spread into the pattern of replica channels 18a machined into the model platen 30. Since the screen mold 38 will be relatively thin, a 0.070 inch cavity depth with a 0.025 inch depth negative pattern 18b according to one embodiment, there is little depth in the model platen 30 to entrap air in the mold material 40. To further minimize the chances of air entrapment, a tool such as a trowel 41 as shown in FIG. 2 is used to pre-spread at 43 the mold material 40 into the replica channel pattern 18a of the model platen 30 before a solid portion of the screen mold 38 is filled with the mold material 40. The mold material 40 pre-spread into the model platen 30 as shown particularly in FIG. 2.

Subsequently, a straight edge tool 44 as shown in FIG. 3 spreads the mold material 40 into the remaining portion of the pocket 36 formed in the model platen 30 and the thin nature of the cavity formed by the pocket 36 allows any air entrapped within the mold material 40 to escape before the mold material 40 cures. An enlarged cross-sectional view of the relationship of the pocket 36 and mold material 40 within the model platen 30 is shown in FIG. 4.

After the mold material 40 has been spread into the model platen 30 and allowed to cure, the screen mold 38 is removed from the model platen 30 and includes the negative pattern 18b of the slip resistant pattern 18 to be formed into the mat backing 14 as shown particularly in FIG. 5. FIG. 12 shows the entire screen mold 38 with the negative pattern 18b of the mat backing 14. The finished screen mold 38 is the appropriate size of the desired slip resistant mat 10 to be formed.

The screen mold 38 of FIG. 5 according to one embodiment of this invention is utilized to form the rubber slip resistant mat 10 and associated mat backing 14 according to well known manufacturing techniques. The screen mold 38 is likewise shown in FIG. 5A. Advantageously, the screen mold 38 has sufficient durability and definition to yield a detailed and precise channel pattern 18 in the slip resistant mat 10. The mat backing 14 of the finished mat 10 has the same pattern 18 as the replica pattern 18a which was originally machined into the model platen 30 and a negative 18b of the pattern formed in the screen mold 38. By using a screen mold 38 that is both solid backed as shown in FIG. 4 and designed to dispel any air bubbles within the mold material 40 which is a high release silicone rubber, the mat backing 14 has a clean, crisp appearance with little or no residual rubber flashing to interfere with contact to the floor 20.

The pattern 18 on the mat backing 14 of the slip resistant mat 10 according to various embodiments of this invention extends to the edge of the mat 10 to assist in gripping the floor 20, especially for those applications where the mat 10 will be exposed to cart and heavy traffic. The relatively thin width dimension of the replica pattern 18a machined into the pocket 36 of the model platen 30 does not affect the integrity of the screen model 38 which utilizes the mold material 40 of a silicone blend with a reinforcing backing of Nomex® or Kevlar® to create the mat backing 14 of the slip resistant mat 10 according to various embodiments of this invention.

From the above disclosure of the general principles of this invention and the preceding detailed description of at least one embodiment, those skilled in the art will readily comprehend the various modifications to which this invention is susceptible. Therefore, we desire to be limited only by the scope of the following claims and equivalents thereof.

We claim:

1. A method of making a slip resistant mat having a slip resistant pattern on a backing of the mat, the method comprising the steps of:
    forming a model platen with a replica of the slip resistant pattern;
    forming a screen mold with the model platen in which the screen mold has a negative of the slip resistant pattern formed by the replica of the slip resistant pattern; and
    forming the slip resistant mat with the screen mold in which the negative of the slip resistant pattern forms the slip resistant pattern on the backing of the mat.

2. The method of claim 1 wherein the forming of the model platen step is accomplished with a CNC router.

3. The method of claim 1 wherein the model platen is formed from a metal plate.

4. The method of claim 1 further comprising:
    forming a pocket in the model platen with the replica of the slip resistant pattern therein.

5. The method of claim 1 further comprising:
    applying mold material to the model platen; and
    curing the mold material on the model platen to form the screen mold.

6. The method of claim 5 wherein the mold material is a two-part curable silicone mold material in which one part is silicone and another part is Nomex® or Kevlar®.

7. The method of claim 1 further comprising:
    minimizing entrapped air in the screen mold in conjunction with the forming of the screen mold step.

8. The method of claim 5 wherein the forming of the screen mold step further comprises:
    spreading the mold material onto the model platen with a tool.

9. The method of claim 1 wherein the screen mold has a substantially solid backing opposite from the negative of the slip resistant pattern formed thereon.

10. The method of claim 1 wherein the model platen has a substantially solid backing opposite from the replica of the slip resistant pattern formed thereon.

11. A method of making a slip resistant mat having a slip resistant pattern on a backing of the mat, the method comprising the steps of:
    forming a model platen with a replica of the slip resistant pattern;
    forming a pocket in the model platen with the replica of the slip resistant pattern therein;
    forming a screen mold with the model platen in which the screen mold has a negative of the slip resistant pattern formed by the replica of the slip resistant pattern;
    applying mold material to the model platen;
    curing the mold material on the model platen to form the screen mold; and
    forming the slip resistant mat with the screen mold in which the negative of the slip resistant pattern forms the slip resistant pattern on the backing of the mat.

12. The method of claim 11 wherein the forming of the model platen step is accomplished with a CNC router.

13. The method of claim 11 wherein the model platen is formed from a metal plate.

14. The method of claim 11 wherein the mold material is a two-part curable silicone mold material in which one part is silicone and another part is Nomex® or Kevlar®.

15. The method of claim 11 further comprising:
    minimizing entrapped air in the screen mold in conjunction with the forming of the screen mold step.

16. The method of claim 11 wherein the forming of the screen mold step further comprises:
    spreading the mold material onto the model platen with a tool.

17. The method of claim 11 wherein the screen mold has a substantially solid backing opposite from the negative of the slip resistant pattern formed thereon.

18. The method of claim 11 wherein the model platen has a substantially solid backing opposite from the replica of the slip resistant pattern formed thereon.

19. A method of making a slip resistant mat having a slip resistant pattern on a backing of the mat, the method comprising the steps of:
    forming a model platen with a replica of the slip resistant pattern;
    forming a pocket in the model platen with the replica of the slip resistant pattern therein;
    forming a screen mold with the model platen in which the screen mold has a negative of the slip resistant pattern formed by the replica of the slip resistant pattern;
    minimizing entrapped air in the screen mold in conjunction with the forming of the screen mold step;
    applying mold material to the model platen by spreading the mold material onto the model platen with a tool;
    curing the mold material on the model platen to form the screen mold; and
    forming the slip resistant mat with the screen mold in which the negative of the slip resistant pattern forms the slip resistant pattern on the backing of the mat.

20. The method of claim 19 wherein the mold material is a two-part curable silicone mold material in which one part is silicone and another part is Nomex® or Kevlar®.

* * * * *